US012289610B2

(12) United States Patent
Niu et al.

(10) Patent No.: US 12,289,610 B2
(45) Date of Patent: Apr. 29, 2025

(54) NETWORK SIGNALING FOR RADIO RESOURCE MANAGEMENT ENHANCEMENT IN HIGH SPEED TRAIN (HST) SCENARIOS

(71) Applicant: Apple Inc., Cupertino, CA (US)

(72) Inventors: Huaning Niu, San Jose, CA (US); Jie Cui, San Jose, CA (US); Dawei Zhang, Saratoga, CA (US); Yang Tang, San Jose, CA (US); Manasa Raghavan, Sunnyvale, CA (US); Qiming Li, Beijing (CN); Xiang Chen, Campbell, CA (US); Haitong Sun, Cupertino, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 805 days.

(21) Appl. No.: 17/437,787

(22) PCT Filed: Apr. 1, 2021

(86) PCT No.: PCT/CN2021/084859
§ 371 (c)(1),
(2) Date: Sep. 9, 2021

(87) PCT Pub. No.: WO2022/205283
PCT Pub. Date: Oct. 6, 2022

(65) Prior Publication Data
US 2023/0189012 A1  Jun. 15, 2023

(51) Int. Cl.
*H04W 16/18* (2009.01)
*H04W 4/44* (2018.01)
(Continued)

(52) U.S. Cl.
CPC ............ *H04W 16/18* (2013.01); *H04W 4/44* (2018.02); *H04W 36/324* (2023.05); *H04W 36/085* (2023.05)

(58) Field of Classification Search
CPC .... H04W 16/18; H04W 14/44; H04W 36/324
See application file for complete search history.

(56) References Cited

U.S. PATENT DOCUMENTS

| 2017/0105161 A1 | 4/2017 | Axmon |
| 2017/0238141 A1 | 8/2017 | Lindoff et al. |

(Continued)

FOREIGN PATENT DOCUMENTS

| CN | 111225359 A | 6/2020 |
| WO | 20170800680 A1 | 5/2017 |

OTHER PUBLICATIONS

Extended European Search Report for EP Patent Application No. 21870528.3; Mar. 28, 2023.
(Continued)

*Primary Examiner* — Curtis B Odom
(74) *Attorney, Agent, or Firm* — Kowert, Hood, Munyon, Rankin & Goetzel, P.C.

(57) ABSTRACT

A network may transmit either beam deployment information or beam number information to a user equipment (UE) carried on a train and configured for operation in the millimeter wave band. The deployment information may include deployment related distance parameters or azimuth angle spread parameters. The beam number information may indicate a number of network beams associated with a current cell. The UE may determine a number of UE receive beams based on deployment information or the network-indicated number of network beams. The UE may transmit feedback to the network, indicating the number of UE receive beams. Alternatively, the network may send a configuration message indicating a first number of UE receive beams to the UE, which the UE may treat as an upper bound
(Continued)

1250 receive beam number information from a cell of a network, wherein the UE is carried on a train (or vehicle), wherein the beam number information includes a parameter relating to a number of beams associated with the cell  1255 or lower bound in its determination of a desired number of UE receive beams. The UE may transmit the desired number to the network.

18 Claims, 15 Drawing Sheets

(51) Int. Cl.
*H04W 36/32* (2009.01)
*H04W 36/08* (2009.01)

(56) References Cited

U.S. PATENT DOCUMENTS

| | | | |
|---|---|---|---|
| 2018/0331747 A1* | 11/2018 | Kakishima | H04B 7/0626 |
| 2019/0159149 A1 | 5/2019 | Ryu | |
| 2020/0077395 A1 | 3/2020 | Guo | |
| 2020/0120604 A1* | 4/2020 | Nam | H04W 76/28 |
| 2020/0374079 A1 | 11/2020 | Chervyakov | |
| 2021/0392597 A1* | 12/2021 | Xu | H04W 56/009 |
| 2023/0020735 A1* | 1/2023 | Matsumura | H04B 7/0695 |

OTHER PUBLICATIONS

International Search Report and Written Opinion for PCT/CN2021/084859; 8 pages; Jan. 4, 2022.
Intel Corporation "Views on high speed train deployments scenarios in FR2"; 3GPP TSG-RAN WG4 Meeting #97e R4-2014564; 14 pages; Nov. 13, 2020.
Samsung "Discussion on high speed train deployment scenario in FR2"; 3GPP TSG-RAN WG4 Meeting #97e R4-2014847; 5 pages; Nov. 13, 2020.
Office Action for CN Patent Application for Invention No. 202180005655.6; Sep. 28, 2024.

* cited by examiner

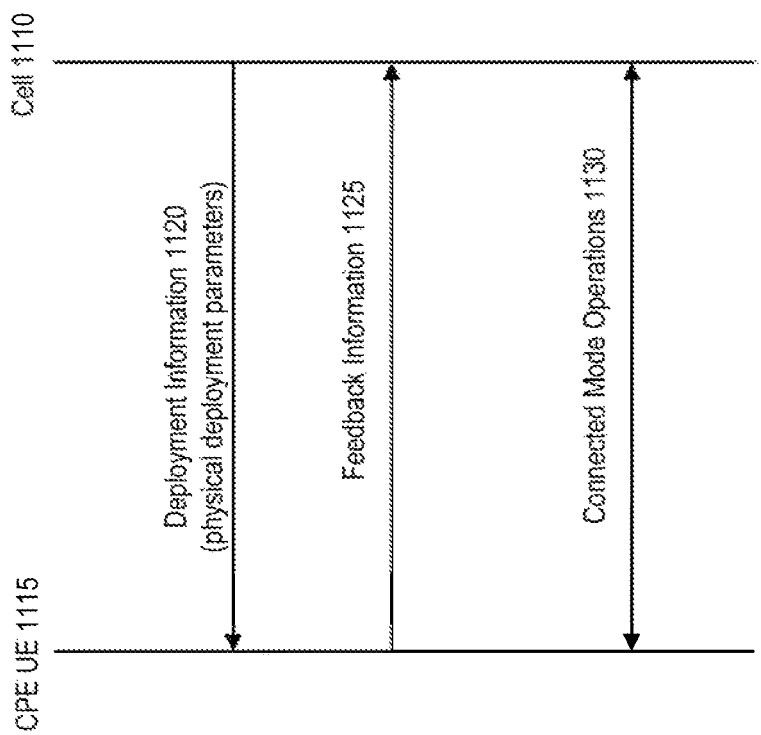

```
ServingCellConfigCommonSIB ::= SEQUENCE {
    ...
    [[
    highSpeedFR2ConfigFR2-r17  HighSpeedFR2ConfigFR2-r17  OPTIONAL
    ]]
}

HighSpeedFR2Config-r17 ::= SEQUENCE {
    highSpeedMeasFR2Flag-r17 ENUMERATED {true} OPTIONAL,
    highSpeedDemodFR2Flag-r17 ENUMERATED {true} OPTIONAL,
    D_min ENUMERATED {10, 20, 30, ....... 150} OPTIONAL
    Ds ENUMERATED {300, ....... 700, 800} OPTIONAL
    Coverage_angle_min ENUMERATED {1,2,3,.... 10, 20, 30, ....... 90} OPTIONAL
    Coverage_angle_max ENUMERATED {10, 20, 30, ....... 180} OPTIONAL
    ...
}
```

FIG. 11B

```
maxUERxBeamHighSpeedFR2-PreferenceConfig-r17 ::= SEQUENCE {
    maxUERxBeamHighSpeedFR2-PreferenceConfig-r17 ::= ENUMERATED{1, 2,
        3, 4, 5, 6, 7, 8}
}
```

FIG. 11C

1150 receive deployment information from a cell of a network, wherein the UE device is carried by a train (or vehicle), wherein the deployment information relates to deployment of the cell in relation to a track of the train   1155

*FIG. 11D*

1160 transmit deployment information to a user equipment (UE) device, where transmission-reception points of the base station are deployed along a track of the train (or along a vehicle path), where the deployment information relates to deployment of a cell of the base station in relation to the train track   1165

*FIG. 11E*

```
ServingCellConfigCommonSIB ::= SEQUENCE {
    ssb-PositionsInBurst SEQUENCE {
        inOneGroup BIT STRING (SIZE (8)),
        groupPresence BIT STRING (SIZE (8)) OPTIONAL -- Cond Above6GHzOnly
    },
    ssb-periodicityServingCell ENUMERATED { ms5, ms10, ms20, ms40, ms80,
                                            ms160, spare2, spare1 }
    ssb_perRRH ENUMERATED {1, 2, 4} OPTIONAL
    directionalSFN Choice {
        Uni-directional
        Bi-directional
    } OPTIONAL
    ssb_perPanel ENUMERATED {1, 2, 4} OPTIONAL
}
```

FIG. 12B

1250 

receive beam number information from a cell of a network, wherein the UE is carried on a train (or vehicle), wherein the beam number information includes a parameter relating to a number of beams associated with the cell   1255

*FIG. 12C*

1260 

transmit beam number information to a user equipment (UE) device, where transmission-reception points of the base station are deployed along a track of a train (or along a vehicle path), where the beam number information includes a parameter relating to a number of beams associated with a cell of the base station   1265

> receive a configuration message from a cell of a network, wherein the configuration message indicates a first number of receive beams for the UE device, wherein the UE is carried on a train (or vehicle)  1410

> transmit a configuration message to a user equipment (UE) device, where transmission-reception points of the base station are deployed along a track of a train (or along a vehicle path), where the configuration message indicates a first number of receive beams for the UE device  1510

*FIG. 15*

NETWORK SIGNALING FOR RADIO RESOURCE MANAGEMENT ENHANCEMENT IN HIGH SPEED TRAIN (HST) SCENARIOS

FIELD

The present disclosure relates to the field of wireless communication, and more particularly, to mechanisms for network signaling to enhance radio resource management (RRM) processes, e.g., in the context of high speed train (HST) deployments.

DESCRIPTION OF THE RELATED ART

A network may transmit to and/or receive from user equipment (UE) travelling on a train, e.g., a high speed train. The network may distribute cells along the train track with multiple transmission-reception points (TRP) per cell, e.g., to exploit the benefits of single frequency network (SFN) operation within each cell. The UE may be handed over between cells as the UE moves from one cell to the next. The UE may have one or more antenna arrays to generate one or more spatially directed receive beams and/or transmit beams per array, Similarly, each TRP may include one or more antenna arrays to generate spatially directed receive beams and/or transmit beams. When operating at high frequencies such as the millimeter wave band, the use of beams (e.g., narrowly focused beams) may be needed to overcome issues such as propagation loss.

SUMMARY

In some embodiments, a method for operating a user equipment (UE) device may include receiving deployment information from a cell of a network, where the UE device is carried by a train (or vehicle), or a Customer Premises Equipment (CPE) device mounted on the roof top of the train. The deployment information may relate to a deployment of the cell in relation to a track of the train.

In some embodiments, the deployment information may indicate a distance between successive transmission-reception points (TRPs) of the cell.

In some embodiments, the deployment information may indicate an average value of minimum distances between transmission-reception points of the cell and a track of the train.

In some embodiments, the deployment information may indicate a spread in azimuth angle over which the UE device is expected to receive from transmission-reception points of the cell.

In some embodiments, the method may also include calculating a preferred number of receive beams to use for downlink reception from the cell based on the deployment information and an antenna configuration of the UE device.

In some embodiments, the method may also include transmitting feedback information to the cell, wherein the feedback information includes the preferred number.

In some embodiments, a method for operating a user equipment (UE) device may include receiving beam number information from a cell of a network, wherein the UE is carried on a train (or vehicle). The beam number information may include a parameter relating to a number of beams associated with the cell.

In some embodiments, the parameter may be a number of network beams per remote radio head of the cell.

In some embodiments, the beam number information may also include a flag that indicates whether a deployment of remote radio heads (RRHs) of the cell is of uni-directional SFN type or bi-directional SFN type. (SFN is an acronym for Single Frequency Network.)

In some embodiments, the parameter may also include a number of network beams per panel of remote radio heads of the cell.

In some embodiments, the method may also include calculating a preferred number of receive beams to use for downlink reception from the cell based on the beam number information and an antenna configuration of the UE device.

In some embodiments, the method may also include transmitting feedback information to the cell, wherein the feedback information includes the preferred number.

In some embodiments, a method for operating a user equipment (UE) device may include receiving a configuration message from a cell of a network, wherein the configuration message indicates a first number of receive beams for the UE device, wherein the UE is carried on a train.

In some embodiments, the method may also include determining a second number of receive beams to be used by the UE device based at least in part on the first number.

In some embodiments, the first number may serve as an upper bound for the determination of the second number.

In some embodiments, the first number may serve as a lower bound for the determination of the second number.

In some embodiments, the method may also include transmitting to the cell a feedback message, wherein feedback message indicates whether or not the first number is confirmed by the UE device.

In some embodiments, the method may also include transmitting to the cell a feedback message, wherein the feedback message includes a request for adjustment of the first number.

In some embodiments, a non-transitory memory medium may store program instructions. The program instructions, when executed by processing circuitry, may cause the processing circuitry to perform any of the method embodiments described above.

In some embodiments, a user equipment (UE) device may include a radio subsystem; processing circuitry coupled to the radio subsystem; and memory storing program instructions. The program instructions, when executed by the processing circuitry, may cause the UE device to perform any of the method embodiments described above.

In some embodiments, a non-transitory memory medium may store program instructions. The program instructions, when executed by processing circuitry, may cause the processing circuitry to perform any of the method embodiments described above.

In some embodiments, a base station may include a radio subsystem; processing circuitry coupled to the radio subsystem; and memory storing program instructions. The program instructions, when executed by the processing circuitry, may cause the base station to perform any of the method embodiments described above.

BRIEF DESCRIPTION OF THE DRAWINGS

A better understanding of the present subject matter can be obtained when the following detailed description of the preferred embodiment is considered in conjunction with the following drawings.

FIG. 11A illustrates a method that enables a UE device to compute a number of receive beams based on network-provided deployment information, according to some embodiments.

FIG. 11B illustrates an example of a ServingCeliConfig-CommonSIB structure that contains deployment information, according to some embodiments.

FIG. 11C illustrates an example of a maxUERxBeam-HighSpeedPR2-PreferenceConfig-r17 structure that may be used to indicate a UE's beam number preference, according to some embodiments.

FIG. 11D illustrates a method for receiving deployment information at a user equipment device, according to some embodiments.

FIG. 11E illustrates a method for transmitting deployment information by a base station, according to some embodiments.

FIG. 12B illustrates an example of a ServingCellConfig-CommonSIB structure that contains beam number information, according to some embodiments.

FIG. 12C illustrates a method for receiving beam number information at a user equipment device, according to some embodiments.

FIG. 12D illustrates a method for transmitting beam number information by a base station, according to some embodiments.

FIG. 14 illustrates a method for operating a user equipment device to receive beam number configuration from a network, according to some embodiments.

FIG. 15 illustrates a method for operating a base station to transmit beam number configuration to a user equipment device, according to some embodiments.

Figure 1:
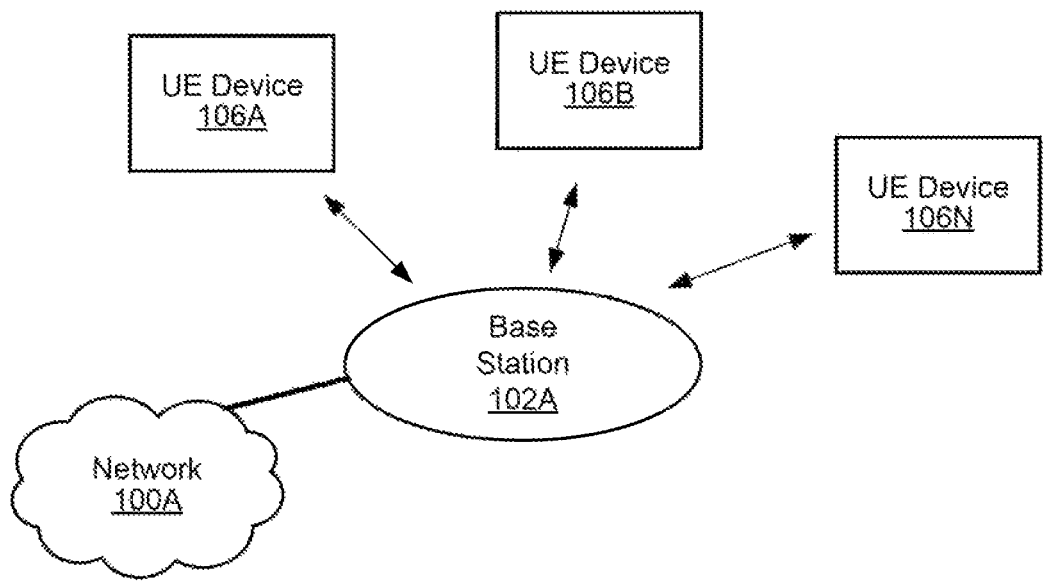
FIGS. 1-2 illustrate examples of wireless communication systems, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in this disclosure.
3GPP: Third Generation Partnership Project
3GPP2: Third Generation Partnership Project 2
5G NR: $5^{th}$ Generation New Radio
BW: Bandwidth
CSI: Channel State Information
CSI-RS: CSI Reference Signal
DCI: Downlink Control Information
DL: Downlink
eNB (or eNodeB): Evolved Node B. i.e., the base station of 3GPP LTE
gNB (or gNodeB): next Generation NodeB, i.e., the base station of 5G NR
GSM: Global System for Mobile Communications
HARQ: Hybrid ARQ
LTE: Long Term Evolution
LTE-A: LTE-Advanced
MAC: Media Access Control
MAC-CE: MAC Control Element
NR: New Radio
NR-DC: NR Dual Connectivity
NW: Network
PBCH: Physical Broadcast Channel
PDCCH: Physical Downlink Control Channel
PDSCH: Physical Downlink Shared Channel
RAT: Radio Access Technology
RLM: Radio Link Monitoring
RNTI: Radio Network Temporary Identifier
RRC: Radio Resource Control
RRM: Radio Resource Management
RS: Reference Signal
SR: Scheduling Request
SSB: Synchronization Signal/PBCH Block
TCI: Transmission Configuration Indication
UE: User Equipment
UL: Uplink
UMTS: Universal Mobile Telecommunications System Terms The following is a glossary of terms used in this disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations. e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDS (Programmable Logic Devices), FPGAs (Field Programmable Object Arrays), and CPLDS (Complex PLDS). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems. including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to any of various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
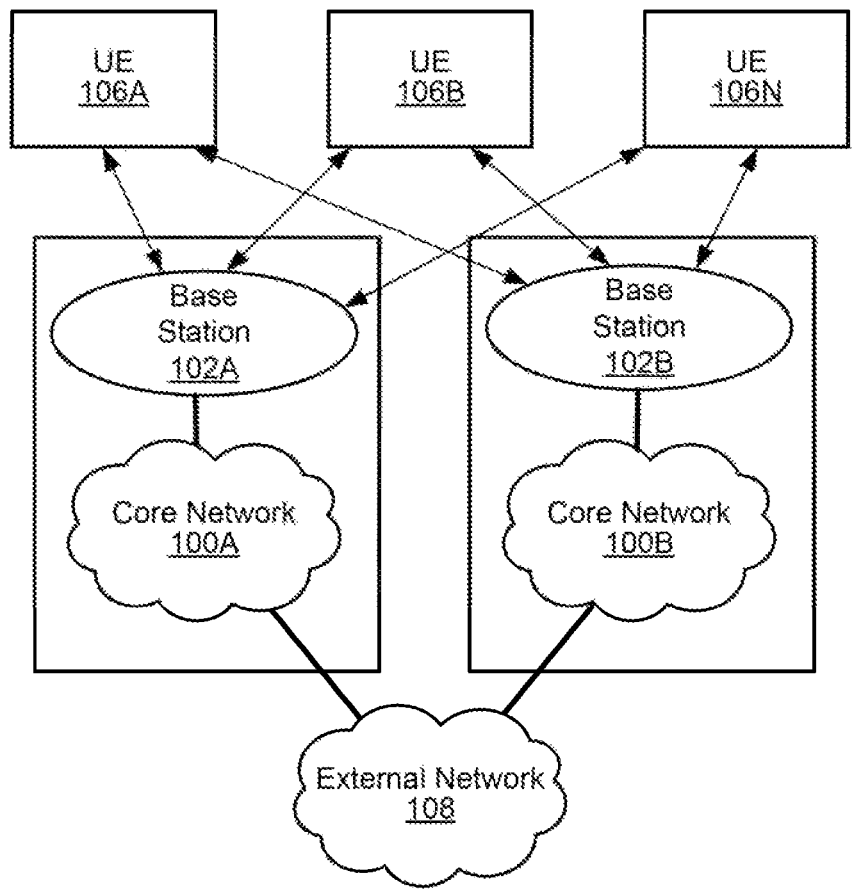
Figure 3:
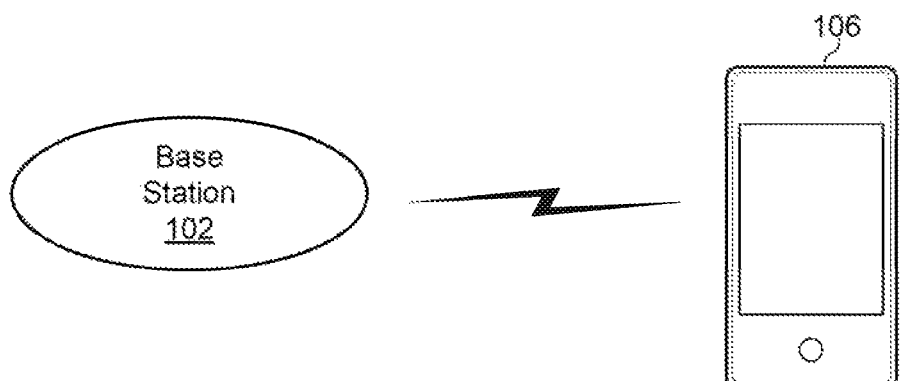
FIG. 3 illustrates an example of a base station in communication with a user equipment device, according to some embodiments.

FIGS. 1-3: Communication System

FIGS. 1 and 2 illustrate exemplary (and simplified) wireless communication systems. It is noted that the systems of FIGS. 1 and 2 are merely examples of certain possible systems, and various embodiments may be implemented in any of various ways, as desired.

The wireless communication system of FIG. 1 includes a base station 102A which communicates over a transmission medium with one or more user equipment (UE) devices 106A, 106B, etc., through 106N. Each of the user equipment devices may be referred to herein as "user equipment" (UE). In the wireless communication system of FIG. 2, in addition to the base station 102A, base station 1028 also communicates (e.g., simultaneously or concurrently) over a transmission medium with the UE devices 106A. 106B, etc., through 106N.

The base stations 102A and 102B may be base transceiver stations (BTSs) or cell sites, and may include hardware that enables wireless communication with the user devices 106A through 106N. Each base station 102 may also be equipped to communicate with a core network 100 (e.g., base station 102A may be coupled to core network 100A, while base station 102B may be coupled to core network 100B), which may be a core network of a cellular service provider. Each core network 100 may be coupled to one or more external networks (such as external network 108), which may include the Internet, a Public Switched Telephone Network (PSTN), or any other network. Thus, the base station 102A may facilitate communication between the user devices and/or between the user devices and the network 100A; in the system of FIG. 2, the base station 102B may facilitate communication between the user devices and/or between the user devices and the network 100B.

The base stations 102A and 102B and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc.

For example, base station 102A and core network 100A may operate according to a first cellular communication standard (e.g., LTE) while base station 102B and core network 100B operate according to a second (e.g., different) cellular communication standard (e.g., GSM, UMTS, and/or one or more CDMA2000 cellular communication standards). The two networks may be controlled by the same network operator (e.g., cellular service provider or "carrier"), or by different network operators. In addition, the two networks may be operated independently of one another (e.g., if they operate according to different cellular communication standards), or may be operated in a somewhat coupled or tightly coupled manner.

Note also that while two different networks may be used to support two different cellular communication technologies, such as illustrated in the network configuration shown in FIG. 2, other network configurations implementing multiple cellular communication technologies are also possible. As one example, base stations 102A and 102B might operate according to different cellular communication standards but couple to the same core network. As another example, multi-mode base stations capable of simultaneously supporting different cellular communication technologies (e.g., LTE and CDMA 1×RTT, GSM and UMTS, or any other combination of cellular communication technologies) might be coupled to a core network that also supports the different cellular communication technologies. Any of various other network deployment scenarios are also possible.

As a further possibility, it is also possible that base station 102A and base station 102B may operate according to the same wireless communication technology (or an overlapping set of wireless communication technologies). For example, base station 102A and core network 100A may be operated by one cellular service provider independently of base station 102B and core network 100B, which may be operated by a different (e.g., competing) cellular service provider. Thus in this case, despite utilizing similar and possibly compatible cellular communication technologies, the UE devices 106A-106N might communicate with the base stations 102A-102B independently, possibly by utilizing separate subscriber identities to communicate with different carriers' networks.

A UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). As another example, a UE 106 might be configured to communicate using different 3GPP cellular communication standards (such as two or more of GSM, UMTS, LTE, or LTE-A). Thus, as noted above, a UE 106 might be configured to communicate with base station 102A (and/or other base stations) according to a first cellular communication standard (e.g., LTE) and might also be configured to communicate with base station 102B (and/or other base stations) according to a second cellular communication standard (e.g., one or more CDMA2000 cellular communication standards, UMTS, GSM, etc.).

Base stations 102A and 102B and other base stations operating according to the same or different cellular communication standards may thus be provided as one or more networks of cells, which may provide continuous or nearly continuous overlapping service to UEs 106A-106N and similar devices over a wide geographic area via one or more cellular communication standards.

A UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 3 illustrates user equipment 106 (e.g., one of the devices 106A through 106N) in communication with a base station 102 (e.g., one of the base stations 102A or 102B). The UE 106 may be a device with wireless network connectivity such as a mobile phone, a hand-held device, a computer or a tablet, a wearable device or virtually any type of wireless device.

The UE may include a processor that is configured to execute program instructions stored in memory. The UE may perform any of the method embodiments described herein by executing such stored instructions. Alternatively, or in addition, the UE may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of GSM, UMTS (W-CDMA, TD-SCDMA, etc.), CDMA2000 (1×RTT, 1×EV-DO, HRPD, eHRPD, etc.), LTE, LTE-A, WLAN, or GNSS. Other combinations of wireless communication standards are also possible.

The UE 106 may include one or more antennas for communicating using one or more wireless communication protocols. Within the UE 106, one or more parts of a receive and/or transmit chain may be shared between multiple wireless communication standards; for example, the UE 106 might be configured to communicate using either (or both) of GSM or LTE using a single shared radio. The shared radio may include a single antenna, or may include multiple antennas (e.g., for MIMO or beamforming) for performing wireless communications. MIMO is an acronym for Multi-Input Multiple-Output.

Figure 4:
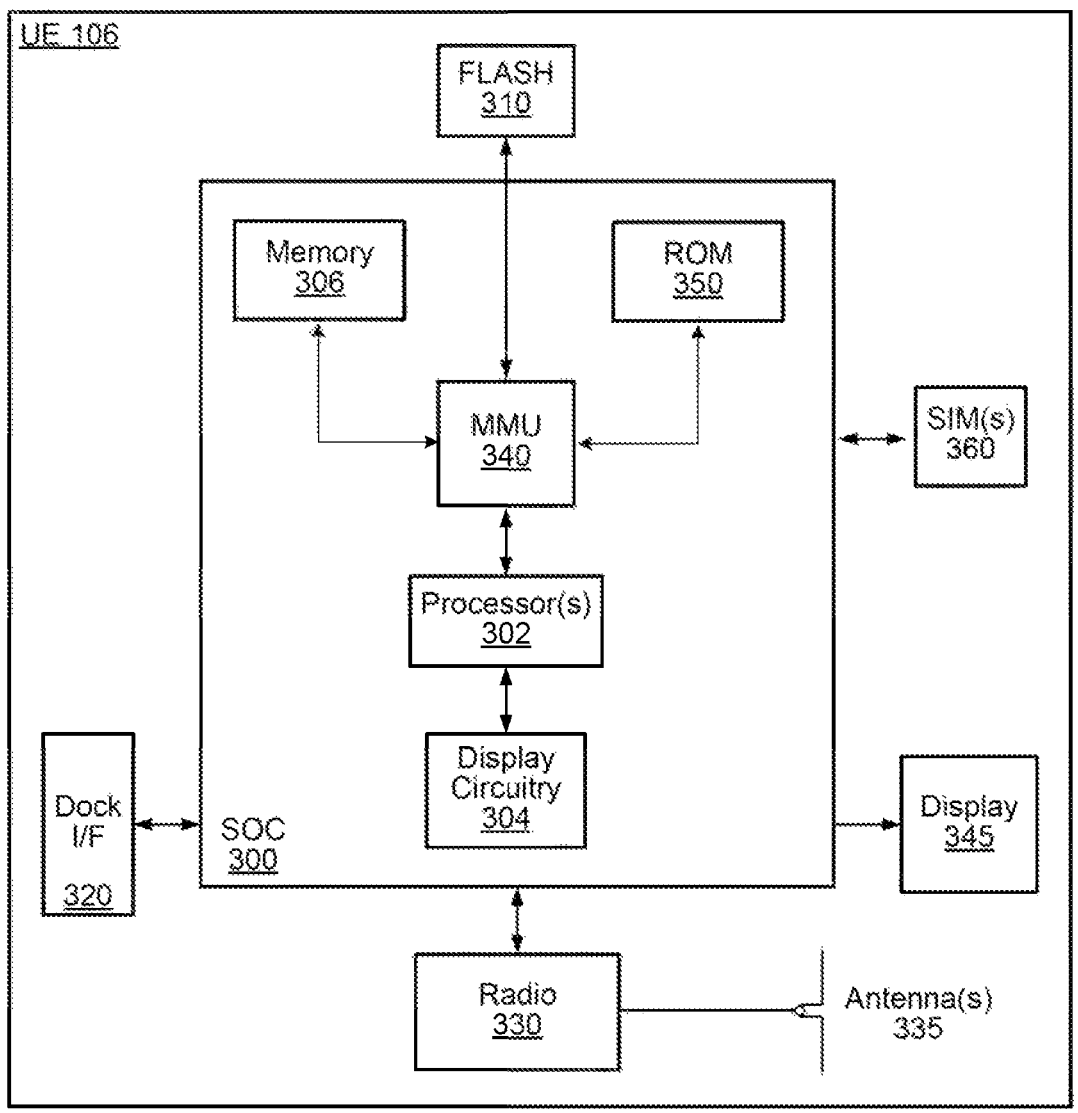
FIG. 4 illustrates an example of a block diagram of a user equipment device, according to some embodiments.

FIG. 4—Example of Block Diagram of a UE

FIG. 4 illustrates an example of a block diagram of a UE 106. As shown, the UE 106 may include a system on chip (SOC)300, which may include portions for various purposes. For example, as shown, the SOC 300 may include processor(s) 302 which may execute program instructions for the UE 106 and display circuitry 304 which may perform graphics processing and provide display signals to the display 345. The processor(s) 302 may also be coupled to memory management unit (MMU) 340, which may be configured to receive addresses from the processor(s) 302 and translate those addresses to locations in memory (e.g., memory 306, read only memory (ROM)350, NAND flash memory 310) and/or to other circuits or devices, such as the display circuitry 304, radio 330, connector I/F 320, and/or display 345. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including Flash memory 310), a connector interface 320 (e.g., for coupling to a computer system, dock, charging station, etc.), the display 345, and radio 330.

The radio 330 may include one or more RF chains. Each RF chain may include a transmit chain, a receive chain, or both. For example, radio 330 may include two RF chains to support dual connectivity with two base stations (or two cells). The radio may be configured to support wireless communication according to one or more wireless communication standards, e.g., one or more of GSM, UMTS, LTE, LTE-A, WCDMA, CDMA2000, Bluetooth, Wi-Fi, GPS, etc.

The radio 330 couples to antenna subsystem 335, which includes one or more antennas. For example, the antenna subsystem 335 may include a plurality of antennas to support applications such as dual connectivity or MIMO or beamforming. The antenna subsystem 335 transmits and receives radio signals to/from one or more base stations or devices through the radio propagation medium, which is typically the atmosphere.

In some embodiments, the processor(s) 302 may include a baseband processor to generate uplink baseband signals and/or to process downlink baseband signals. The processor(s) 302 may be configured to perform data processing according to one or more wireless telecommunication standards, e.g., one or more of GSM, UMTS, LTE, LTE-A, WCDMA, CDMA2000, Bluetooth, Wi-Fi, GPS, etc.

The UE 106 may also include one or more user interface elements. The user interface elements may include any of various elements, such as display 345 (which may be a touchscreen display), a keyboard (which may be a discrete keyboard or may be implemented as part of a touchscreen display), a mouse, a microphone and/or speakers, one or more cameras, one or more sensors, one or more buttons, sliders, and/or dials, and/or any of various other elements capable of providing information to a user and/or receiving/interpreting user input.

As shown, the UE 106 may also include one or more subscriber identity modules (SIMs) 360. Each of the one or more SIMs may be implemented as an embedded SIM (eSIM), in which case the SIM may be implemented in device hardware and/or software. For example, in some embodiments, the UE 106 may include an embedded UICC (eUICC), e.g., a device which is built into the UE 106 and is not removable. The eUICC may be programmable, such that one or more eSIMs may be implemented on the eUICC. In other embodiments, the eSIM may be installed in UE 106 software, e.g., as program instructions stored on a memory medium (such as memory 306 or Flash 310) executing on a processor (such as processor 302) in the UE 106. As one example, a SIM 360 may be an application which executes on a Universal Integrated Circuit Card (UICC). Alternatively, or in addition, one or more of the SIMs 360 may be implemented as removable SIM cards.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as or include: a programmable hardware element, such as an FPGA (Field Programmable Gate Array); or an ASIC (Application Specific Integrated Circuit); or a combination thereof.

Figure 5:
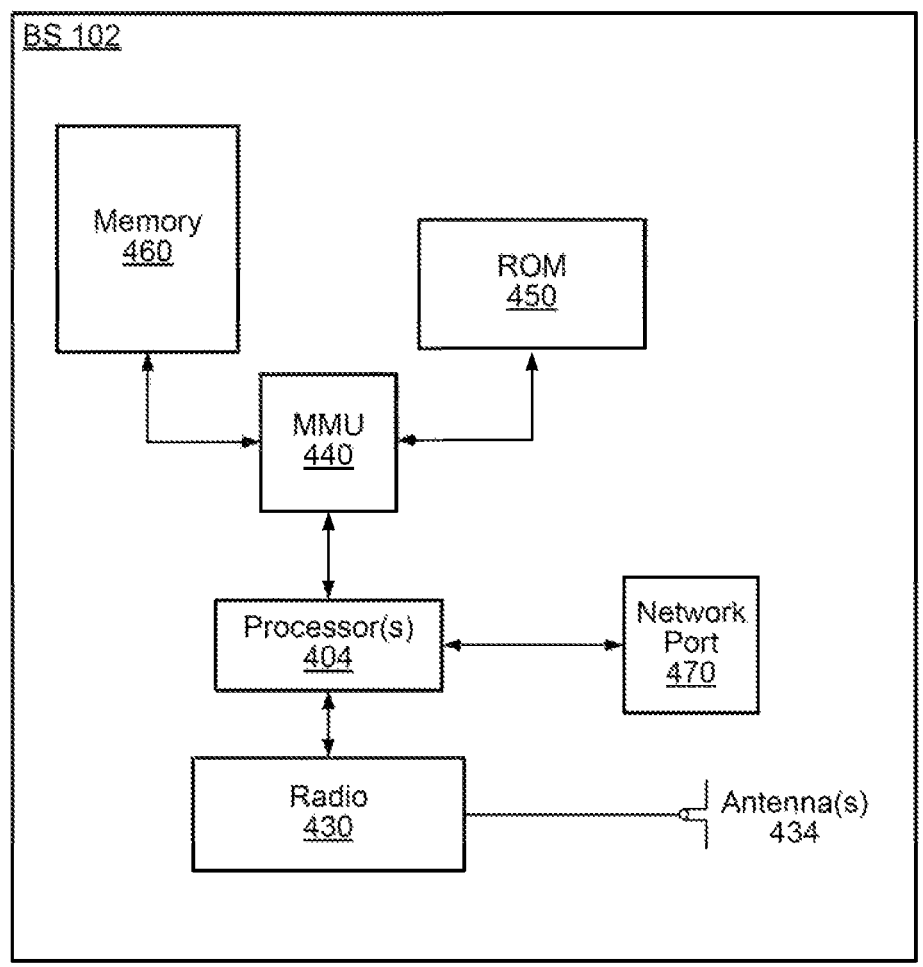
FIG. 5 illustrates an example of a block diagram of a base station, according to some embodiments.

FIG. 5—Example of a Base Station

FIG. 5 illustrates a block diagram of a base station 102. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory ROM 450) or to other circuits or devices.

The base station 102 may include at least one network port 470. The network port 470 may be configured to couple to a telephone network and provide access (for a plurality of devices, such as UE devices 106) to the telephone network, as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430 having one or more RF chains. Each RF chain may include a transmit chain, a receive chain, or both. (For example, the base station 102 may include at least one RF chain per sector or cell.) The radio 430 couples to antenna subsystem 434, which includes one or more antennas. Multiple antennas would be needed, e.g., to support applications such as MIMO or beamforming. The antenna subsystem 434 transmits and receives radio signals to/from IEs through the radio propagation medium (typically the atmosphere).

In some embodiments, the processor(s) 404 may include a baseband processor to generate downlink baseband signals and/or to process uplink baseband signals. The baseband processor may be configured to operate according to one or more wireless telecommunication standards, including, but not limited to, GSM, LTE, 5G New Radio, WCDMA, CDMA2000, etc.

The processor(s) 404 of the base station 102 may be configured to implement any of the methods described herein, e.g., by executing program instructions stored on a memory medium (e.g., a non-transitory computer-readable memory medium). In some embodiments, the processor(s) 404 may include: a programmable hardware element, such as an FPGA (Field Programmable Gate Array); or an ASIC (Application Specific Integrated Circuit), or a combination thereof.

Figure 6:
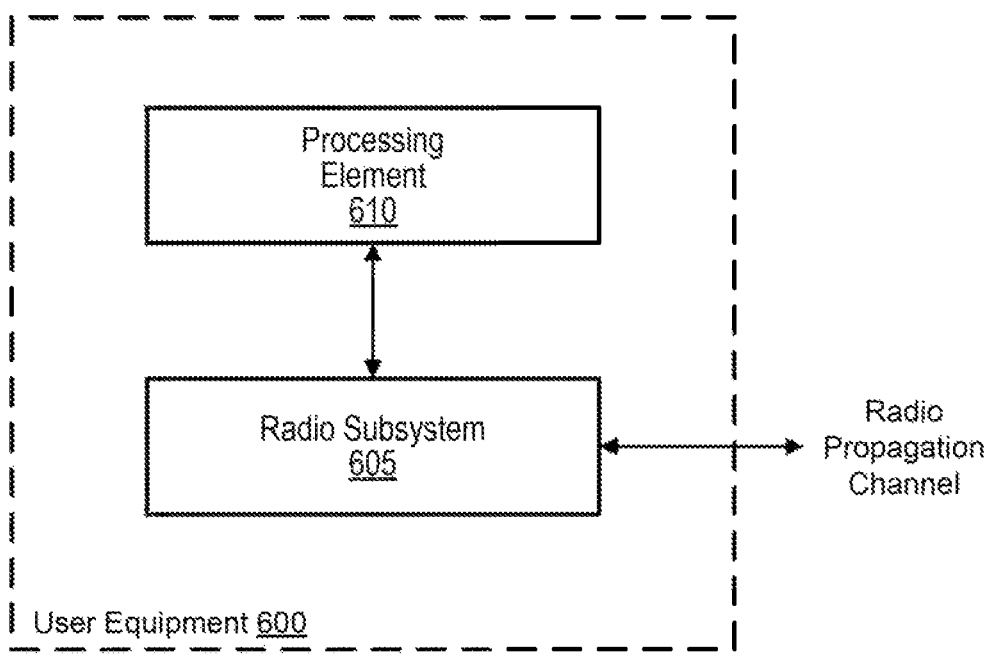
FIG. 6 illustrates an example of a user equipment 600, according to some embodiments.

In some embodiments, a wireless user equipment (UE) device 600 may be configured as shown in FIG. 6. UE device 600 may include: a radio subsystem 605 for performing wireless communication; and a processing element 610 operatively coupled to the radio subsystem. (UE device 600 may also include any subset of the UE features described above, e.g., in connection with FIGS. 1-4.)

The radio subsystem 605 may include one or more RF chains, e.g., as variously described above. Each RF chain may be configured to receive signals from the radio propagation channel and/or transmit signals onto the radio propagation channel. Thus, each RF chain may include a transmit chain and/or a receive chain. The radio subsystem 605 may be coupled to one or more antennas (or, one or more arrays of antennas) to facilitate signal transmission and reception. Each RF chain (or, some of the RF chains) may be tunable to a desired frequency, thus allowing the RF chain to receive or transmit at different frequencies at different times.

The processing element 610 may be coupled to the radio subsystem, and may be configured as variously described above. (For example, processing element may be realized by processor(s) 302.) The processing element may be configured to control the state of each RF chain in the radio subsystem. The processing element may be configured to perform any of the UE-based method embodiments described herein.

In some embodiments, the processing element may include one or more baseband processors to (a) generate baseband signals to be transmitted by the radio subsystem and/or (b) process baseband signals provided by the radio subsystem.

In a dual connectivity mode of operation, the processing element may direct a first RF chain to communicate with a first base station using a first radio access technology and direct a second RF chain to communicate with a second base station using a second radio access technology. For example, the first RF chain may communicate with an LTE eNB, and the second RF chain may communicate with a gNB of 5G New Radio (NR). The link with the LTE eNB may be referred to as the LTE branch. The link with the gNB may be referred to as the NR branch. In some embodiments, the processing element may include a first subcircuit for baseband processing with respect to the LTE branch and a second subcircuit for baseband processing with respect to the NR branch.

The processing element 610 may be further configured as variously described in the sections below.

Figure 7:
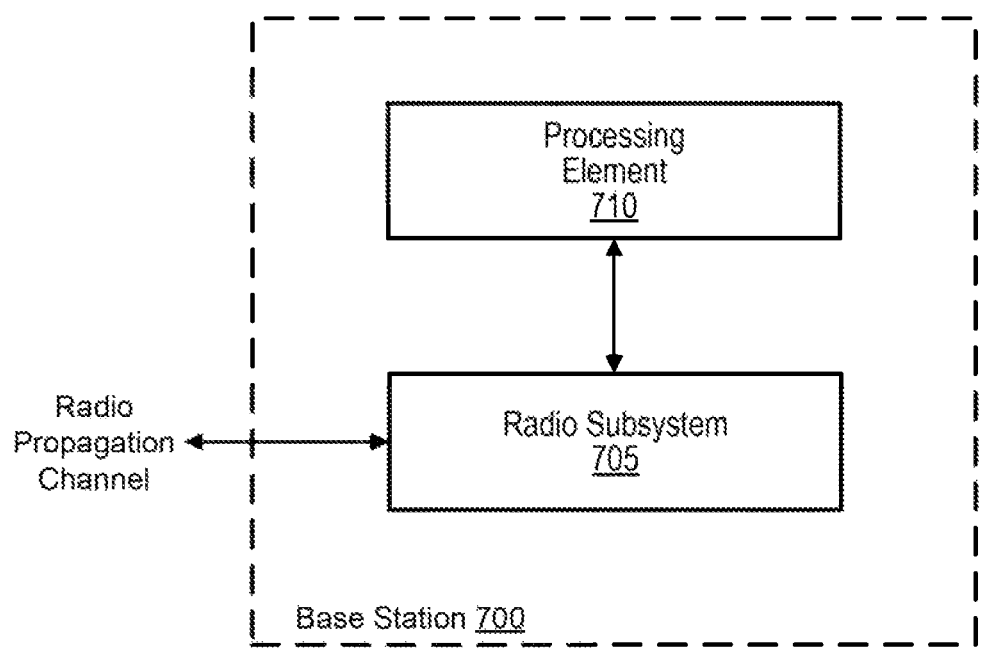
FIG. 7 illustrates an example of a base station 700, according to some embodiments. The base station 700 may be used to communicate with user equipment 600 of FIG. 6.

In some embodiments, a wireless base station 700 of a wireless network (not shown) may be configured as shown in FIG. 7. The wireless base station may include: a radio subsystem 705 for performing wireless communication over a radio propagation channel; and a processing element 710 operatively coupled to the radio subsystem. (The wireless base station may also include any subset of the base station features described above, e.g., the features described above in connection with FIG. 5.)

The radio subsystem 710 may include one or more RF chains. Each RF chain may be tunable to a desired frequency, thus allowing the RF chain to receive or transmit at different frequencies at different times. The radio subsystem 710 may be coupled to an antenna subsystem, including one or more antennas, e.g., an array of antennas, or a plurality of antenna arrays. The radio subsystem may employ the antenna subsystem to transmit and receive radio signals to/from radio wave propagation medium.

The processing element 710 may be realized as variously described above. For example, in one embodiment, processing element 710 may be realized by processor(s) 404. In some embodiments, the processing element may include one or more baseband processors to: (a) generate baseband signals to be transmitted by the radio subsystem, and/or, (b) process baseband signals provided by the radio subsystem.

The processing element 710 may be configured to perform any of the base station method embodiments described herein.

Network Signaling for RRM Enhancement (e.g., in FR2 HST)

In some embodiments, a user equipment (UE) may be mounted in or on a train, e.g., a high speed train (HST), and configured to operate at high frequencies, e.g., in the millimeter wave band. The UE may be referred to as a CPE UE, wherein CPE is an acronym for Customer Premises Equipment. Cells of a network may be distributed along the train track (or path). Each cell may have one or more transmission-reception points (TRPs). Each TRP may include on or more antenna panels. For example, a base station (e.g., gNB in the context of 3GPP 5G) may include a pool of baseband units (BBUs) that couple to respective remote radio heads (RRHs), with the RRHs realizing the TRPs. As the train travels along its path, the UE may be handed over from one cell to the next. Within the coverage area of each cell, the UE and the cell may communicate via one or more of the TRPs of the cell. When communicating via more than one TRP, the cell may behave like a Single Frequency Network (SFN). When communicating via one TRP at a time, the transmission scheme is called DPS (dynamic point selection). As the UE moves with a cell, the base station may send TCI state updates to the UE so that the base station may use appropriate beam(s) for its current position. (TCI is an acronym for Transmission Configuration Indication.)

The transmissions between a cell and a UE may be bi-directional or uni-directional. Uni-directional means that the cell is configured to support communication with the UE only via TRPs ahead of the UE, or alternatively, only via TRPs behind the UE, relative to the direction of train motion. (A TRP is said to be ahead of the UE if its x coordinate is larger than the UE's x coordinate, where the x axis is defined by the train track, and the positive x direction is the direction of train motion. A TRP is said to be behind the UE if its x coordinate is less than the UE's x coordinate.) Thus, in the uni-directional mode, the UE may communicate only with one or more TRPs ahead the UE, or alternatively, only with one or more TRPs behind the UE.) For example, the UE may include only a forward-looking panel, and the TRPs of the cell may include only backward-looking panels. (A panel is said to be forward looking if its pointing direction makes an angle of less than 90 degree with respect to the direction of train motion. A panel is said to be backward looking if its pointing direction makes an angle of less than 90 degrees with respect to the direction opposite to train motion.)

In contrast, at least in some embodiments, bi-directional means that the UE may have to switch between the use of forward-pointing UE beam(s) and backward-pointing UE beam(s) because the TRPs of the cell include both forward-looking panel(s) and backward-looking panel(s). For example, a cell may include TRPs, each of which (or, some of which) include both a forward-looking panel and a backward-looking panel. Likewise, the UE may include both a forward looking panel and a backward looking panel. The UEs forward looking panel may transmit and/or receive from a TRP's backward looking panel; and the UE's backward looking panel may transmit and/or receive from a TRP's forward looking panel. In this context, the terms "uni-directional" and "bi-directional" are not referring to uplink and downlink directions.

In some embodiments, the cells and the UE may be configured to communicate in the Frequency Range 2 (FR2) of 3GPP 5G. However, the cells and the UE of the present disclosure are not limited to operating in FR2 or in the context of 3GPP.

Figure 8:
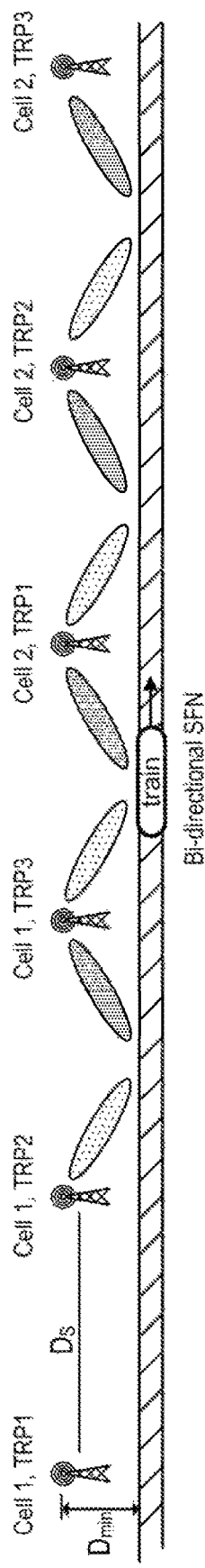
FIGS. 8 and 9 respectively illustrate a scenario A and a scenario B in a high speed train (HST) scenario, according to some embodiments.
Figure 9:
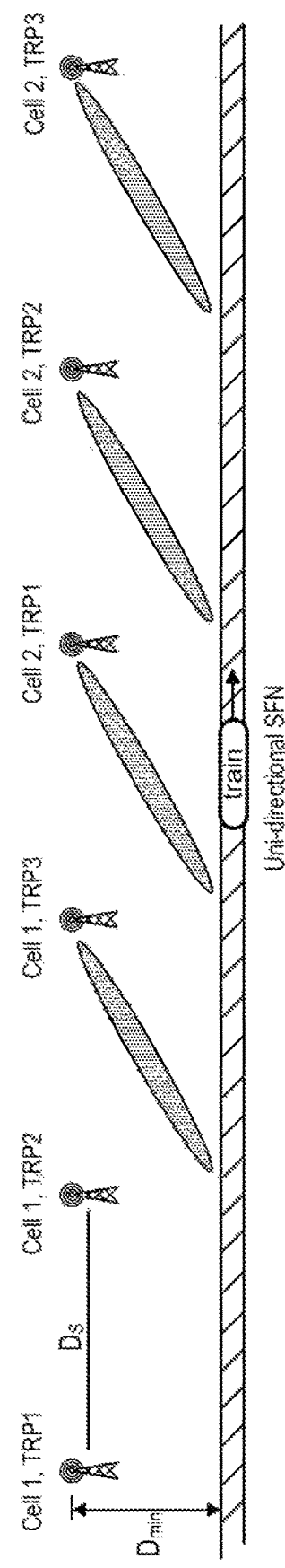

FIGS. 8 and 9 illustrates two different deployment scenarios, according to some embodiments. Each Figure illustrates a view generally from above the train track. While the TRPs of cells are shown as being situated on one side of the track, it should be noted that a wide variety of arrangements from TRPs are possible.

The distance $D_S$ is the distance between successive TRPs of a cell. The distance $D_{min}$ is the minimum distance between a TRP (e.g., an RRH) of a cell and the train track (or, between the RRHs and the UE) Each TRP will have a corresponding value of $D_{min}$.

FIG. 8 illustrates an example of scenario A, where the distance $D_S$ is approximately 700 meters, and the distance $D_{min}$ is approximately 10 meters. While FIG. 8 illustrates a bi-directional example of scenario A, it should be understood that scenario A may be realized in a uni-directional fashion as well. FIG. 9 illustrates an example of scenario B, where the distance $D_S$ is approximately 700 meters, and the distance $D_{min}$ is approximately 150 meters. While FIG. 9 illustrate a uni-directional example of scenario B, it should be understood that scenario B may be realized in a bi-directional fashion as well.

TABLE of Scenario Parameters

| Scenario | $D_S$ (meter) | $D_{min}$ (meter) |
|---|---|---|
| A | 700 | 10 |
| B | 700 | 150 |

While the scenarios A and B are introduced to facilitate discussion, it should be understood that the present invention is not limited to such scenarios, and that a wide variety of scenarios having a wide variety of combinations of parameter values are contemplated.

As shown in FIGS. 8 and 9, scenario A employs a smaller distance $D_{min}$ than scenario B. For example, in scenario A, the operator of the network may engage in a business collaboration with a train operator, allowing the network operator to place their TRPs (e.g., RRHs) close to the train track and/or within train tunnels. In scenario B, the larger value of $D_{min}$ may arise from any of a variety of motivations, e.g., a concern for safety.

The number N of UE beams is a key parameters in Radio Resource Management (RRM) processes. Unfortunately, in current 3GPP specifications, the value of N is fixed at 8 for SSB related RRM measurements in idle mode when DRX cycle is 320 ms, and connected mode. (SSB is an acronym for Synchronization Signal/PBCH Block. PBCH is an acronym for Physical Broadcast Channel. DRX is an acronym for Discontinuous Reception.) Thus, to enhance the performance of RRM processes, it would be desirable to reduce the value of N, whenever possible, instead of using a fixed value of N. Reducing the value of N decreases the overhead associated with signaling beam updates to the UE device.

The number of UE receive beams may depend on factors such as the deployment scenario; the UE antenna configuration; and the RRH antenna configuration. The deployment scenario may include one or more fields such as: the value of $D_S$, the value of $D_{min}$, a bi-directional/uni-directional flag, etc.

In some embodiments, the network may provide information to the UE that assists the UE in determining the number of UE receive beams. For example, for scenario A with uni-directional deployment, one receive beam (N=1) can be used. For scenario A with bi-directional deployment, 2 receive beams (N=2) can be used, e.g., when the UE is configured with a 4×4 antenna panel. For scenario B, a higher number of receive beams (e.g. 4, or 8) may be needed.

Figure 10A:
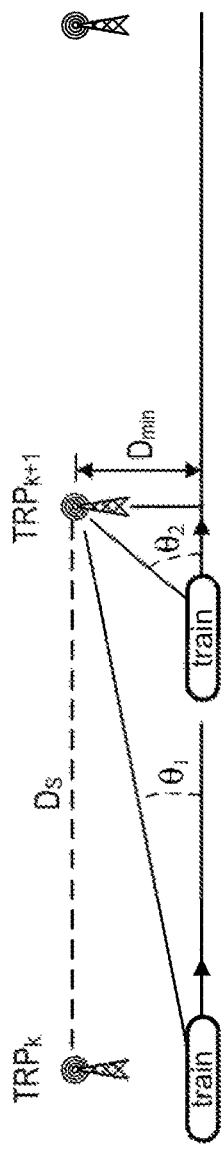
FIG. 10A illustrates azimuth angles $\theta_1$ and $\theta_2$ of a transmission-reception point as seen from a user equipment (UE) situated on a train, at respective positions along the train track, according to some embodiments.

A receive beam and/or transmit beam of the UE may be configured to cover an extent of azimuth angle bounded by the angle $\theta_1$ and the angle $\theta_2$, as shown in FIG. 10A. The angle $\theta_1$ may be defined as the azimuth angle of the $TRP_{k+1}$ (the next TRP) as seen by the UE at or near $TRP_k$ (a current TRP). The angle $\theta_1$ depends on the values of $D_S$ and $D_{min}$. The angle $\theta_2$ may be defined as the azimuth angle of $TRP_{k+1}$, as seen by the UE close to $TRP_{k+1}$. For example, the angle $\theta_2$ may be defined as the azimuth angle when the UE is at distance $cD_S$ from the $TRP_{k+1}$, where c is be a positive constant less than ½, or less than ¼, or less than ⅛, or less than 1/10, or less than 1/16, or less than 1/32, or less than 1/64.

Figure 10B:
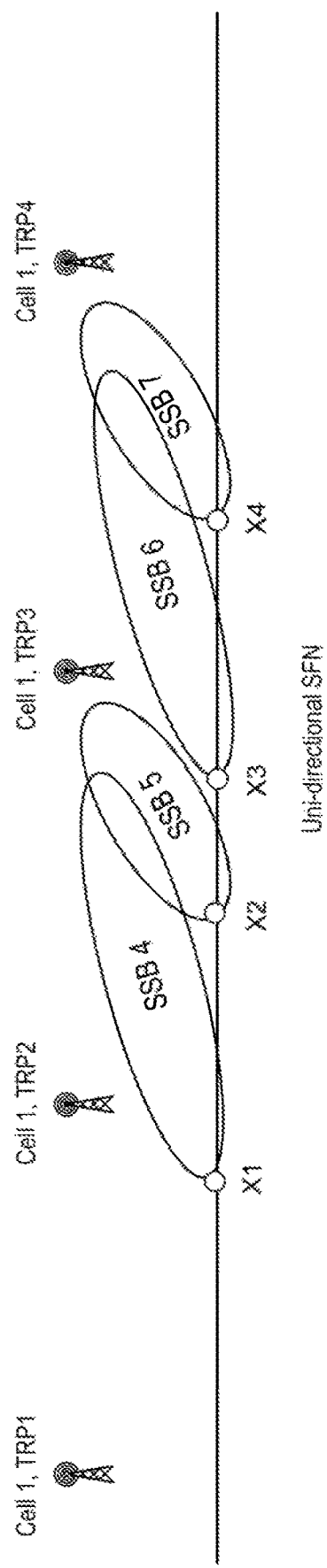
FIG. 10B illustrates an example where a train-carried LIE uses different beams as it moves along a track, with different beam indices being assigned to different transmission-reception points (TRPs) of a cell, according to some embodiments.

In some embodiments, the UE may use assistance information from network (e.g., from a cell of the network) to apply an autonomous, uplink timing advance (TA) adjustment between RRHs of a cell, in a uni-directional SFN deployment. When TC state switching occurs from one RRH to another RRH, a TA adjustment (e.g., a large TA adjustment) may be expected. As shown in FIG. 10B, in a dynamic point selection (DPS) transmission scenario, each transmission-reception point (TRP) of the cell may be associated with a pair (or subset) of SSB indices. For example, TRP3 may be associated with SSB indices 4 and 5, while TRP4 may be associated with SSB indices 6 and 7, When the UE is switching from a TC state associated with SSB index 5 to a TC state associated with SSB index 6, the propagation delay may increase by a substantial value, e.g., when $D_S$ is large. (The UE may use different beams at different positions along the track. For example, beams corresponding to SSB 4, SSB 5, SSB 6 and SSB 7 are shown respectively at positions X1, X2, X3 and X4, with the X axis corresponding to the track. The UE transitions from TRP3 to TRP4 between positions X3 and X4.) A TA adjustment (e.g., a one time adjustment) may be performed when transitioning from one RRH to the next, e.g., based on the change in the received downlink SSB timing. To enable the UE to perform the TA adjustment, the network (e.g., the cell) may signal the assistance information to the UE. In some embodiments, the assistance information may include the deployment information described below in connection with FIGS. 11A-11E, or the beam number information described below in connection with FIGS. 12A-12D.

It should be noted that the specific values mentioned in the above discussion are provided for the sake of illustration. Parameters such as $D_S$, $D_{min}$, the number of TRPs per cell, the number of panels per RRH, the number of antennas per panel, the mapping of SSB indices to TRPs may each take a variety of values, e.g., depending on application scenario, performance requirements, etc.

Signaling Deployment Information to the UE

In some embodiments, a cell 1110 of a network and a CPE UE 1115 may communicate as shown in FIG. 11A. The cell may transmit deployment information 120 to the UE 1115. The deployment information may include physical deployment parameters describing the deployment of the cell (or TRPs of the cell) in relation to the track (or pathway) of a train, on which the UE is conveyed. The network and the UE may be configured for FR2 (High Speed Train) HST deployment. However, a wide variety of other deployments are contemplated, e.g., outside the context of 3GPP 5G, or outside of the context of 3GPP. The deployment information may be repeatedly broadcasted as part of System Information Block (SIB) transmissions from the cell. However, other means of conveying the deployment information are possible and contemplated.

In some embodiments, the deployment information may include: an average (or typical or representative) value of $D_{min}$ for TRPs of the cell; and a value of $D_S$ for TRPs of the cell, in other embodiments, the deployment information may include an indication of a spread in azimuth angle that the UE is required (or recommended) to cover by its receive beam(s) and/or transmit beam(s). (Azimuth angle is the angle that sweeps in the horizontal plane.) For example, the deployment information may indicate a minimum azimuth angle and a maximum azimuth angle.

In some embodiments, the deployment information may be transmitted (or broadcasted) to the UE as part of a ServingCellConfigCommon structure or a ServingCellConfigCommonSIB structure. One realization of ServingCell- ConfigCommonSIB is given in FIG. 11B. However, a wide variety of other realizations are contemplated, e.g., with other different elements, different element ordering, different sets of possible values for the elements, etc.

In some embodiments, the UE may calculate a preferred number of UE receive beams based on the UE's antenna configuration and the deployment information. (The calculation may be performed assuming HST FR2 as the context.) The UE may transmit feedback information 1125 to the cell, where the feedback information includes the preferred number of UE receive beams.

In some embodiments, the preferred number of UE receive beams may be calculated under the assumption that their pointing directions are distributed so that they together cover a spread of azimuth angle, and that they each have the same angular spread in elevation. The azimuth angle spread may be determined based on the deployment information.

In some embodiments, the feedback information may include the preferred number of UE receive beams per UE panel, and the number of panels through which the UE can simultaneously perform measurement, e.g., RRM measurement. (The term "panel" refers to antenna panels.)

In some embodiments, the feedback information may include the preferred number of UE receive beams of the UE, regardless of the number of UE panels. For example, if the UE has 2 panels, each with one receive beam, the feedback information may include the number N=2.

In some embodiments, the feedback information may be transmitted to the cell as part of a UE capability message, or as part of an otherConfig message.

In some embodiments, the feedback information may include a structure referred to as maxUERxBeamHighSpeedFR2-PreferenceConfig-r17, as shown in FIG. 11C. However, a wide variety of other realizations are contemplated, e.g., with other different elements, different element ordering, different sets of possible values for the elements, etc.

After having transmitted the feedback information 1125, the UE may engage in connected-mode operations 1130 using the preferred number of UE receive beams. The connected-mode operations may include processes such as connected-mode measurement, downlink data reception, uplink data transmission, etc. (The uplink data transmission may use a number of UE transmit beams equal to the preferred number of UE receive beams.)

In some embodiments, the processing circuitry may calculate an adjustment (e.g., an autonomous, one time adjustment) of an uplink timing advance (UL TA) based on the deployment information, e.g., as variously described above. The processing circuitry may then apply the calculated adjustment to the uplink timing advance when performing an uplink transmission to the cell (e.g., to a TRP of the cell).

In one set of embodiments, a method 1150 for operating a user equipment (UE) device may include the operations shown in FIG. 11D. (The method 1150 may also include any subset of the features, elements or operations described above.) The method 1150 may be performed by processing circuitry of the UE device, e.g., by the processing element 610 of user equipment 600.

As shown at 1155, the processing circuitry may receive deployment information from a cell of a network, wherein the UE device is carried by a train. (More generally, the UE device may be carried by a vehicle that travels along a path.) For example, the UE device may be mounted on top of a car of the train. The deployment information may relate to deployment of the cell (or transmission-reception points of the cell) in relation to a track of the train.

In some embodiments, the UE device and the cell (i.e., the base station that hosts the cell) are configured for operation in the millimeter wave band, e.g., in the Frequency Range 2 of 3GPP 5G New Radio.

In some embodiments, the deployment information may indicates a distance between successive transmission-reception points (TRPs) of the cell.

In some embodiments, the deployment information may indicate an average value of a minimum distance between a track of the train and transmission-reception points of the cell.

In some embodiments, the deployment information may indicate a spread in azimuth angle over which the UE device is expected to receive from transmission-reception points of the cell.

In some embodiments, the processing circuitry may calculate a preferred number of receive beams to use for downlink reception from the cell (from TRPs of the cell) based on the deployment information and an antenna configuration of the UE device.

In some embodiments, the processing circuitry may transmit feedback information to the cell, wherein the feedback information includes the preferred number.

In one set of embodiments, a method 1160 for operating a base station may include the operations shown in FIG. 11. (The method 1160 may include any subset of the features, elements or operations described above.) The method 1160 may be performed by processing circuitry of the base station, e.g., by the processing element 710 of base station 700.

As shown at 1165, the processing circuitry may transmit deployment information to a user equipment (UE) device, where transmission-reception points of the base station are deployed along a track of the train (or along a vehicle path). The UE device may be carried by the train (or vehicle). The deployment information may relate to deployment of a cell of the base station in relation to the train track.

In some embodiments, the deployment information may indicate a distance between successive transmission-reception points (TRPs) of the base station.

In some embodiments, the deployment information may indicate an average value of minimum distances between the transmission-reception points and a track of the train.

In some embodiments, the deployment information may indicate a spread in azimuth angle over which the UE device is expected to receive from transmission-reception points of the base station.

In some embodiments, the processing circuitry may receive feedback information from the LIE device, wherein the feedback information includes a number of UE receive beams preferred by the UE device.

In some embodiments, the processing circuitry may perform (a) downlink transmission to the UE device via a number of downlink transmit beam equal to the UE's preferred number, and/or, (b) uplink reception from the UE device via a number of uplink reception beams equal to the UE's preferred number.

In some embodiments, the base station may be realized by a gNB of 3GPP 5G New Radio).

In some embodiments, the base station and the UE device are configured for operation in the millimeter wave band, e.g., in the Frequency Range 2 of 3GPP 5G New Radio.

In some embodiments, the TRPs of the base station are configured for bi-direction SFN operation. In other embodiments, the TRP are configured for uni-directional SFN operation.

Signalling Beam Number Information to the UE

Figure 12A:
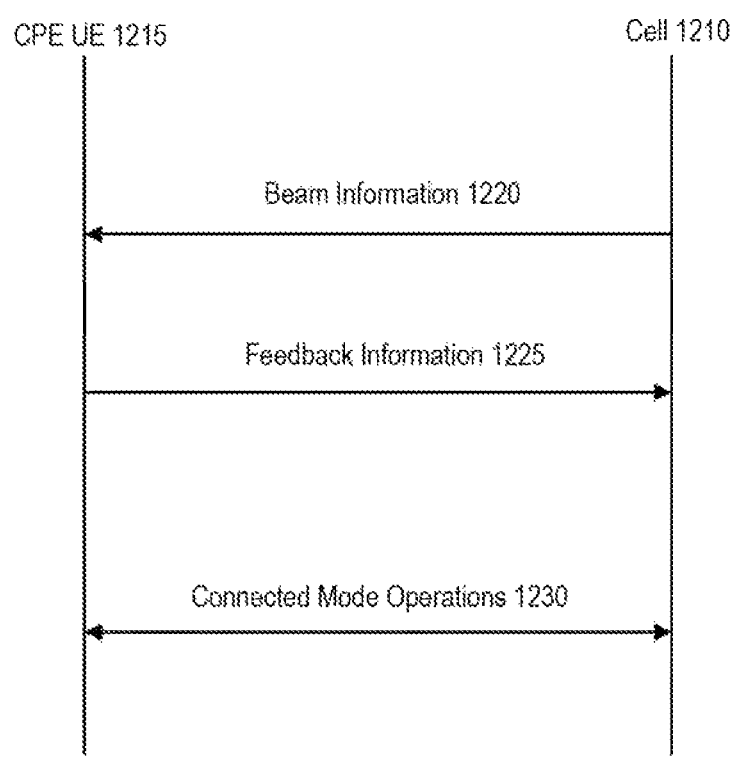
FIG. 12A illustrates a method that enable a UE device to determine a number of receive beams based on network-side beam number information, according to some embodiments.

In some embodiments, a cell 1210 of a network and a CPE UE 1215 may communicate as shown in FIG. 12A. The network may be configured for operation along a track (or pathway) of a train, e.g., as variously described above in connection with FIGS. 8-10. For example, the network and the UE may be configured for FR2 High Speed Train (HST) deployment. (However, a wide variety of other deployments are contemplated, e.g., outside the context of 3GPP 5G, or outside of the context of 3GPP.) The UE may be carried on the train, e.g., mounted on top of the train.

The cell may transmit beam number information 1220 to the UE 1115. The beam number information may include one or more parameters relating to the number(s) of network beams associated with the cell. The beam number information may be repeatedly broadcasted as part of System Information Block (SIB) transmissions from the cell. However, other means of conveying the beam number information are possible and contemplated.

In some embodiments, the beam number information may include: a number of network beams per remote radio head (RRH) of the cell, and a flag indicating whether the deployment of the cell's RRHs is of uni-directional SFN type or bi-directional SFN type. (SFN is an acronym for Single Frequency Network.)

In other embodiments, the beam number information may include the number of network beams per panel of RRHs in the cell. An RRH may include one or more antenna panels. (In bi-directional deployments, the RRHs of a cell may include at least two antenna panels: at least one that points generally forward, and at least one that points generally backward, relative to the direction of train motion.)

In some embodiments, the beam number information may be transmitted to the cell as part of ServingCellConfigCommon, or as part of ServingCellConfigCommonSIB. One realization of ServingCellConfigCommonSIB is given in FIG. 12B. However, a wide variety of other realizations are contemplated, e.g., with other different elements, different element ordering, different sets of possible values for the elements, etc.

In some embodiments, the cell may provide beam index signaling per RRH (or TRP) within the cell, e.g., as described above in connection with FIG. 10B. Each TRP of the cell may correspond to a distinct pair (or subset) of SSB indices. (SSB is an acronym for Synchronization Signal/PBCH Block.) For example, TRP1 may correspond to SSB indices 0 and 1 (beams 0 and 1); TRP2 may correspond to SSB indices 2 and 3 (beams 2 and 3); and so on. The UE may receive the SSB indices, and perform beam switching based on the SSB indices.

In some embodiments, the UE may perform an uplink timing advance adjustment, e.g., using the SSB indices and/or the above described beam number information.

In some embodiments, the UE may calculate a preferred number of UE receive beams based on the UEs antenna configuration and the beam number information 1220. (The preferred number of UE receive beams may be constrained to be less than or equal to the number of network beams.) As the preferred number of UE antennas is typically smaller than the number of antennas in the network antenna configuration, the beam width of UE beams is typically wider than that of network beams (i.e., beams of the RRHs of the cell).

The UE may transmit feedback information 1225 to the cell, where the feedback information includes the preferred number of UE receive beams. Alternatively, the feedback information may include: the preferred number of UE receive beams per UE panel, and the number of panels through which the UE can simultaneously perform measurement, e.g., RRM measurement. The feedback information may be transmitted to the cell through one or more of its RRHs.

After having transmitted the feedback information, the UE may engage in connected-mode operations 1230 using the preferred number(s) of UE receive beams. The connected-mode operations may include processes such as connected-mode measurement, downlink data reception, uplink data transmission, etc. (The uplink data transmission may use a number of UE transmit beams equal to the preferred number of UE receive beams.)

In some embodiments, processing circuitry may calculate an adjustment (e.g., an autonomous, one-time adjustment) of an uplink timing advance, based at least on uni-directional deployment information provided by the cell, e.g., as variously described above. (For example, the processing circuitry may calculate the adjustment in response to switching from one remote radio head (RRH) of the cell to another.) The processing circuitry may then apply the calculated adjustment to the uplink timing advance when transmitting an uplink signal to the cell (e.g., to a TRP of the cell).

In one set of embodiments, a method 1250 for operating a user equipment (UE) device may include the operations shown in FIG. 12C. (The method 1250 may also include any subset of the features, elements or operations described above.) The method 1250 may be performed by processing circuitry of the UE device, e.g., by the processing element 610 of user equipment 600.

As shown at 1255, the processing circuitry may receive beam number information from a cell of a network, wherein the UE is carried on a train (or a vehicle travelling along a path). The beam number information may include a parameter relating to a number of beams associated with the cell (e.g., associated with RRHs of the cell, or associated with antenna panels of the RRHs).

In some embodiments, the parameter may be a number of network beams per remote radio head of the cell.

In some embodiments, the beam number information may also include a flag that indicates whether a deployment of remote radio heads (RRHs) of the cell is of uni-directional SFN type or bi-directional SFN type.

In some embodiments, the parameter may be a number of network beams per panel of remote radio heads of the cell.

In some embodiments, the processing circuitry may calculate a preferred number of receive beams to use for downlink reception from the cell, based on the beam number information and an antenna configuration of the UE device.

In some embodiments, the processing circuitry may transmit feedback information to the cell, where the feedback information includes the preferred number.

In some embodiments, the UE device and the cell are configured for operation in the millimeter wave band, e.g., in the Frequency Range 2 of 3GPP 5G New Radio.

In one set of embodiments, a method 1260 for operating a base station may include the operations shown in FIG. 12D. (The method 1260 may include any subset of the features, elements or operations described above.) The method 1260 may be performed by processing circuitry of the base station, e.g., by the processing element 710 of base station 700.

As shown at 1265, the processing circuitry may transmit beam number information to a user equipment (UE) device, where transmission-reception points of the base station are deployed along a track of a train (or along a vehicle path). The UE device may be carried on the train (or vehicle). The beam number information may include a parameter relating to a number of beams associated with a cell of the base station.

In some embodiments, the parameter may be a number of network beams per remote radio head of the cell.

In some embodiments, the beam number information may also include a flag that indicates whether a deployment of remote radio heads (RRHs) of the cell is of uni-directional SFN type or bi-directional SFN type.

In some embodiments, the parameter may be a number of network beams per panel of remote radio heads of the cell.

In some embodiments, the processing circuitry may receive feedback information from the UE device, wherein the feedback information includes a number of receive beams preferred by the UE device.

In some embodiments, the processing circuitry may perform (a) downlink transmission to the UE device via a number of downlink transmit beam equal to the UE's preferred number, and/or, (b) uplink reception from the UE device via a number of uplink reception beams equal to the UE's preferred number.

In some embodiments, the base station and the UE device are configured for operation in the millimeter wave band, e.g., in the Frequency Range 2 of 3GPP 5G New Radio.

In some embodiments, the base station may be realized by a gNB of 3GPP 5G New Radio.

Network Configures the Number of LIE Receive Beams

Figure 13:
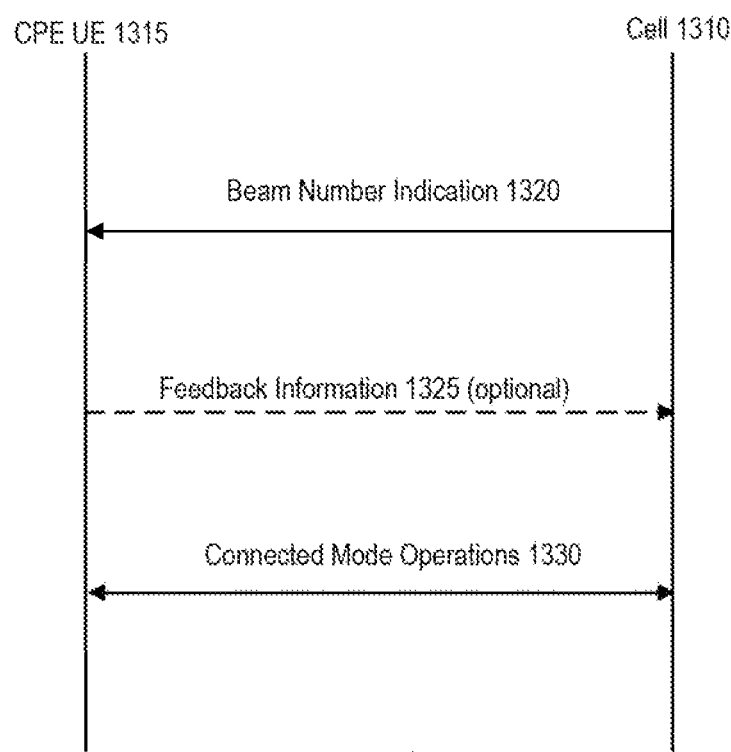
FIG. 13 illustrates a method for configuring a number of receive beams at the UE device, according to some embodiments.

In some embodiments, the network may configure a number of UE receive beams to be used for RRM and beam management. (The network may be arranged to support HST in the millimeter wave band, e.g., in FR2 of 3GPP New Radio.) As shown in FIG. 13, a cell 1310 of the network may transmit an indication 1320 of the number of receive beams selected or recommended for use by a CPE UE 1315. The indication 1320 may be broadcasted as part of System Information Block (SIB) transmissions from a cell of the network. The SIB may be transmitted through TRPs at configured SIB transmission location(s), using the Physical Downlink Shared Channel (PDSCH) scrambled by System Information-Radio Network Temporary identifier (SI-RNTI).

In some embodiments, the network may determine the number of UE receive beams based on the number of network beams that the cell is expected to use for transmission to the UE.

In some embodiments, the UE may be required to use the configured number of UE receive beams, e.g., for connected-mode measurement or beam management. (The amount of time and energy consumed by the LIE for such processes may scale with the configured number.)

In some embodiments, the configured number of UE receive beams will be treated by the UE as an upper bound on the number of receive beams to be used by the LIE. In other embodiments, the configured number of LIE receive beams will be treated as a lower bound on the number of receive beams to be used by the UE.

In some embodiments where the cell configures the number of UE receive beams, the network may not explicitly signal the deployment information 1120 or the beam number information 1220 to the LIE.

In some embodiments, the UE may optionally transmit feedback information 1325 to the network, e.g., the cell 1310. For example, when network configures an upper bound or lower bound on the number of UE receive beams, the feedback information may include a message indicating either that the configured number is confirmed, or that adjustment of the beam number is needed. Furthermore, in one embodiment, the UE may indicate a desired change to the configured beam number, or indicate whether an adjustment is requested in the positive direction or negative direction.

After having received the indication 1320, or after having transmitted the feedback information in the optional case, the UE may engage in connected-mode operations 1330 using the (finally) configured number of UE receive beams. The connected-mode operations may include processes such as connected-mode measurement, downlink data reception, uplink data transmission, etc. (The uplink data transmission may use a number of UE transmit beams equal to the preferred number of UE receive beams.)

In one set of embodiments, a method 1400 for operating a user equipment WE) device may include the operations shown in FIG. 14. (The method 1400 may also include any subset of the features, elements or operations described above.) The method 1400 may be performed by processing circuitry of the UE device, e.g., by the processing element 610 of user equipment 600.

In some embodiments, the processing circuitry may receive a configuration message from a cell of a network. (The cell and the network may be configured for FR2 HST deployment. e.g., as variously described above in connection with FIGS. 8-9.) The configuration message may indicate a first number of receive beams for the UE device, where the UE is carried on a train (or on a vehicle that moves along a path).

In some embodiments, the processing circuitry may determine a second number of receive beams to be used by the UE device, based at least in part on the first number. (The second number may be interpreted as a UE preferred number of receive beams.) This determination may also be based on the antenna configuration of the UE device. The antenna configuration may include, e.g., the number of panels of the UE device, and the number of beams per panel.

In some embodiments, the first number may serve as an upper bound for the determination of the second number.

In some embodiments, the first number may serve as a lower bound for the determination of the second number.

In some embodiments, the processing circuitry may transmit to the cell (e.g., via one or more transmission-reception points of the cell) a feedback message, where feedback message indicates whether or not the first number is confirmed, i.e., accepted for use by the UE device.

In some embodiments, the processing circuitry may transmit to the cell a feedback message, wherein the feedback message includes a request for adjustment of the first number.

In some embodiments, the UE device and the cell are configured for operation in the millimeter wave band, e.g., in the Frequency Range 2 of 3GPP 5G New Radio.

In one set of embodiments, a method 1500 for operating a base station may include the operations shown in FIG. 15. (The method 1500 may include any subset of the features, elements or operations described above.) The method 1500 may be performed by processing circuitry of the base station, e.g., by the processing element 710 of base station 700.

As shown at 1510, the processing circuitry may transmit a configuration message to a user equipment WE) device, where transmission-reception points of the base station are deployed along a track of a train (or along a vehicle path). The UE device may be carried by the train (or vehicle). The configuration message indicates a first number of receive beams for the UE device.

In some embodiments, the first number is an upper bound on a number of receive beams to be used by the UE device.

In some embodiments, the first number is a lower bound on a number of receive beams to be used by the UE device.

In some embodiments, the processing circuitry may receive from the UE device a feedback message, wherein feedback message indicates whether or not the first number is confirmed for use by the UE device.

In some embodiments, the processing circuitry may receive a feedback message from the UE device, wherein the feedback message includes a request for adjustment of the first number. In response to receive the request for adjustment, the base station may determine an updated number of UE receive beams, and transmit the updated number to the UE in a configuration message.

In some embodiments, the base station and the UE device are configured for operation in the millimeter wave band, e.g., in the Frequency Range 2 of 3GPP 5G New Radio.

In some embodiments, a non-transitory memory medium may store program instructions. The program instructions, when executed by processing circuitry, may cause the processing circuitry to perform any of the method embodiments described above, and any combination of those embodiments. The memory medium may incorporated as part of a base station.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE) device, a tablet computer, a wearable computer, etc.

Any of the methods described herein for operating a user equipment (UE) in communication with a base station (or transmission-reception point) may be the basis of a corresponding method for operating a base station (or transmission-reception point), by interpreting each message/signal X received by the UE in the downlink as a message/signal X transmitted by the base station (or transmission-reception point), and each message/signal Y transmitted in the uplink by the UE as a message/signal Y received by the base station (or transmission-reception point).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for operating a user equipment (UE) device, the method comprising:
   receiving beam number information from a cell of a network, wherein the UE is carried on a train, wherein the beam number information includes a parameter relating to a number of beams associated with the cell; and
   calculating an adjustment of an uplink timing advance, based at least on deployment information provided by the cell, wherein the deployment information indicates whether transmissions between the UE and the cell are uni-directional or bi-directional.

2. The method of claim 1, wherein the parameter is a number of network beams per remote radio head of the cell.

3. The method of claim 2, wherein the beam number information also includes a flag that indicates whether a deployment of remote radio heads (RRHs) of the cell is of uni-directional SFN type or bi-directional SFN type.

4. The method of claim 1, wherein the parameter is a number of network beams per panel of remote radio heads of the cell.

5. The method of claim 1, further comprising:
   calculating a preferred number of receive beams to use for downlink reception from the cell based on the beam number information and an antenna configuration of the UE device.

6. The method of claim 5, further comprising:
   transmitting feedback information to the cell, wherein the feedback information includes the preferred number.

7. An apparatus, comprising:
   a processor configured to, when executing instructions stored in a memory, perform operations comprising:
   receiving beam number information from a cell of a network, wherein a user equipment (UE) is carried on a train, wherein the beam number information includes a parameter relating to a number of beams associated with the cell; and
   calculating an adjustment of an uplink timing advance, based at least on deployment information provided by the cell, wherein the deployment information indicates whether transmissions between the UE and the cell are uni-directional or bi-directional.

8. The apparatus of claim 7, wherein the parameter is a number of network beams per remote radio head of the cell.

9. The apparatus of claim 8, wherein the beam number information also includes a flag that indicates whether a deployment of remote radio heads (RRHs) of the cell is of uni-directional SFN type or bi-directional SFN type.

10. The apparatus of claim 7, wherein the parameter is a number of network beams per panel of remote radio heads of the cell.

11. The apparatus of claim 7, the operations further comprising:
calculating a preferred number of receive beams to use for downlink reception from the cell based on the beam number information and an antenna configuration of the UE.

12. The apparatus of claim 11, the operations further comprising:
transmitting feedback information to the cell, wherein the feedback information includes the preferred number.

13. A user equipment (UE), comprising:
a radio; and
a processor communicatively coupled to the radio, wherein the radio and the processor are configured to perform operations comprising:
receiving beam number information from a cell of a network, wherein the UE is carried on a train, wherein the beam number information includes a parameter relating to a number of beams associated with the cell; and
calculating an adjustment of an uplink timing advance, based at least on deployment information provided by the cell, wherein the deployment information indicates whether transmissions between the UE and the cell are uni-directional or bi-directional.

14. The UE of claim 13, wherein the parameter is a number of network beams per remote radio head of the cell.

15. The UE of claim 14, wherein the beam number information also includes a flag that indicates whether a deployment of remote radio heads (RRHs) of the cell is of uni-directional SFN type or bi-directional SFN type.

16. The UE of claim 13, wherein the parameter is a number of network beams per panel of remote radio heads of the cell.

17. The UE of claim 13, the operations further comprising:
calculating a preferred number of receive beams to use for downlink reception from the cell based on the beam number information and an antenna configuration of the UE.

18. The UE of claim 17, the operations further comprising:
transmitting feedback information to the cell, wherein the feedback information includes the preferred number.

* * * * *